J. H. SMITH.
CHERRY PITTING MACHINE.
APPLICATION FILED OCT. 20, 1913.
1,155,449.
Patented Oct. 5, 1915.
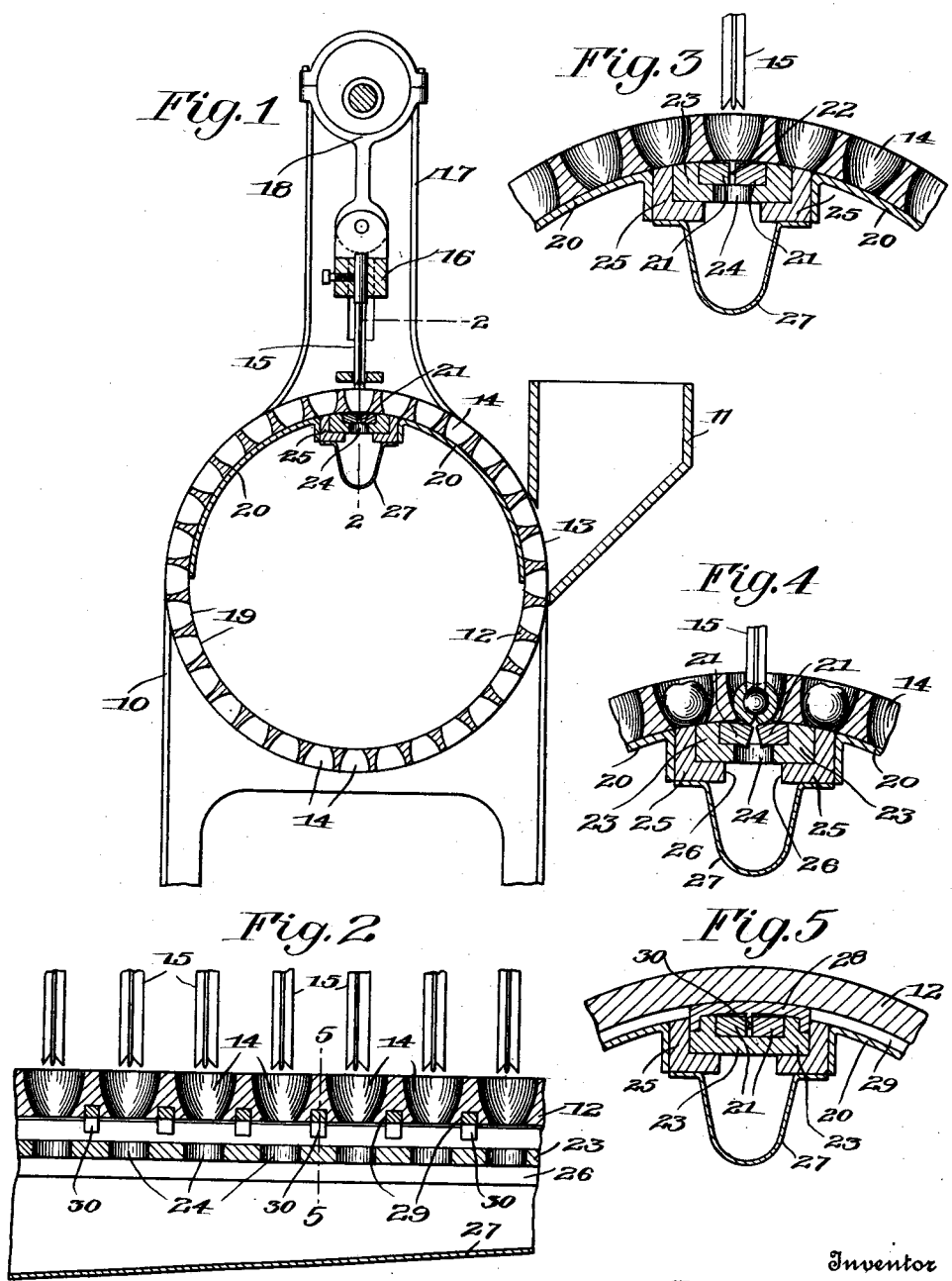
Witnesses
Nelson H. Opp
Clyde L. Rogers
Inventor
James H. Smith
By Church Rich
his Attorneys

UNITED STATES PATENT OFFICE.

JAMES H. SMITH, OF ROCHESTER, NEW YORK, ASSIGNOR TO J. HUNGERFORD SMITH COMPANY, OF ROCHESTER, NEW YORK, A CORPORATION OF NEW YORK.

CHERRY-PITTING MACHINE.

1,155,449.  Specification of Letters Patent.  Patented Oct. 5, 1915.

Application filed October 20, 1913. Serial No. 796,106.

*To all whom it may concern:*

Be it known that I, JAMES H. SMITH, of Rochester, in the county of Monroe and State of New York, have invented certain new and useful Improvements in Cherry-Pitting Machines; and I do hereby declare the following to be a full, clear, and exact description of the same, reference being had to the accompanying drawings, forming a part of this specification, and to the reference numerals marked thereon.

My present invention relates to apparatus for pitting fruit, particularly cherries.

A prime object of the invention is to provide an improved machine adapted to remove the pits rapidly without unnecessary mutilation of the fruit, and in a manner so that the pits are entirely separated from the meat of the cherry, leaving them quite clean.

I attain this object in a preferred embodiment of the invention by mechanism adapted to split the cherries in a substantially diametrical plane, while holding them in a manner so that unnecessary breakage of the skin, elsewhere is avoided.

I also preferably arrange my improved mechanism for simultaneous operation on a considerable number of cherries at once and for the pitting operations to be performed in rapid succession.

The above and other objects and features of the invention will be better understood from the following detailed description taken in connection with the accompanying drawings.

Referring to the drawings: Figure 1 is a transverse sectional view, through a machine constructed in accordance with my invention; Fig. 2 is an enlarged detail section on line 2—2 of Fig. 1; Fig. 3 is an enlarged detail of the principal operating parts on the same section plane, as Fig. 1; Fig. 4 is a view similar to Fig. 3, illustrating the parts in the operation of removing the cherry pit, and Fig. 5 is a detail section on line 5—5 of Fig. 2.

Similar reference numerals throughout the several figures indicate the same parts.

Upon a suitable stand or framework 10 is mounted a supply box or hopper 11, adapted to deliver the cherries to a drum 12 for receiving and holding the cherries while being pitted, this drum being rotatably mounted on the stand, and the delivery point from the chute 11 being shown as lateral of the drum as at 13. The particular manner of operating the drum 12 for a step-by-step movement, forms no part of the present invention and is therefore not herein illustrated. The drum 12 is equipped with lengthwise extending lines of cherry receiving pockets 14, shown as closely spaced around its circumference. Mounted in coöperative relation to the drum and shown as reciprocable directly thereover is a gang of pit pressers 15 adapted to operate simultaneously on all the cherries in one of the lines of pockets 14. The pit pressers 15 are shown as fixed to a head 16 reciprocably mounted in an upward extension 17 of the support stand and an eccentric and link connection 18 is shown as connected to reciprocate the gang of pit pressers with the proper throw. The drum 12 is shown in the form of an annular ring with the pockets 14 of a cup shape having reduced openings into the interior of the drum as at 19, to permit the stones to be pressed out as is usual. Guard plates 20 are fixed in position to close the bottoms of the pockets in the upper part of the drum, these plates being spaced apart at the top of the drum to receive between them, the holding means for my improved devices, which coöperate with the pit pressers for removing the pits.

In accordance with my invention, I mount directly beneath the line of pockets 14 at the top of the drum—*i. e.* directly beneath the pressers 15, a pair of parallel strips 21, facing each other and quite close together, though preferably spaced a small definite distance apart as hereinafter explained, as shown at 22, these strips being adapted to yield with some little resistance to permit the opening between them to be enlarged sufficiently for the passage of a cherry pit, as it is forced between them. To this end the strips are preferably formed of rubber or like resilient material and they are fitted in seats of a holder bar 23, which bar has passages 24 therethrough at intervals, so that the adjacent edges of these strips can yield downwardly to permit the passage of the cherry pit. The bar 23 is shown as mounted in L shape holding strips 25 suitably supported on the machine framework and spaced apart, as seen at 26, for the cherry pits to drop therethrough into a receiving chute 27 extending endwise of the machine with a downward slope. The strips 21 preferably extend the length of the drum and to insure that they be held in proper relative position parallel to each other and correctly spaced, I show spacing pieces 28 fitted to be held on the bar 23 between the pockets 14 and extending up into annular grooves of the drum, as shown at 29, these spacing pieces having ribs 30 extending in between the strips 21 as spacers.

It may now be understood that as the cherries are engaged from above by the pit pressers 15, they are pressed down through the seats 14 against the strips 21 which offer a substantial backing for the action of the pressers, so that the meat of the cherry is pressed against the adjacent lips of these strips 21 at each side. As the pressers continue their downward movement, the adjacent lips of the strips 21 in separating as the strips are pressed downward, split the cherry between them in a substantially diametrical plane to permit the pit to pass out under the continuing pressure of the pressers. By reference to Fig. 4, it will be observed that while this action occurs, after the initial breakage of the cherry skin the cherry is supported and has backing over a relatively large area which opposes the pressure of the pressers by reason of the curved bottom of the pockets 14 and the downward curving adjacent faces of the strips 21 which thus protect the meat and skin of the cherry from unnecessary mutilation in the removal of the pit. I preferably space the strips 21 a small distance apart so as to leave the opening 22 between them of definite extent for the reason that thus as the cherry is pressed against this backing, its contact therewith is substantially limited to the two parallel lines constituting the adjacent edges of said strips which thus secure a definite bite on the skin of the cherry to insure its breaking along the desired diametrical line as the strips yield under the downward pressure, whereas if the strips were close together so that there would be a considerable area of the cherry pressed against the strips before the breaking of the skin, the skin would be more apt to break in an uncertain manner with a tendency to greater mutilation. It is to be further observed that in the described operation not only is the cherry neatly split substantially in a diametrical plane at just the right place for the exit of the pit, but as the pit is pressed down through between the strips 21, it is strongly pressed against the edges thereof, so that the complete removal of all particles of the cherry meat which might tend to adhere to the pit, is effected by a rubbing, rolling action upon the pit which insures best results. The cherries thus pitted are discharged from the drum as advanced to a lower point thereof and the pits are delivered to chute 27, while the lines of pockets are replenished with cherries to be treated from the hopper or chute 11, as they arrive thereat.

While I refer herein to the present apparatus, as for the pitting of cherries, this is to be considered as merely illustrative of any kind of fruit or other articles adapted to be treated by the machine in a manner analogous to the operation of cherry pitting. I am aware that the nature and manner of disposition of the yielding strips shown as the strips 21, can be varied considerably without departing from the principles of the invention, and I therefore desire the present form to be considered as illustrative and not restrictive and refer to the appended claims rather than to the foregoing description to indicate the scope of the invention.

I claim as my invention:

1. A cherry pitting machine comprising a cherry holder, a pit presser, and a backing for the cherries consisting in a pair of parallel yielding strips rectangular in cross section spaced apart and adapted to roll apart to split the fruit while the pit is forced between them.

2. A cherry pitting machine comprising a cherry holder, a pit presser and means coöperating with said holder and presser adapted to present a yielding backing to the cherry, said means comprising two portions capable of rolling laterally and separating in a manner to split the cherry in a diametrical plane, as the pit presser is actuated to eject the pit.

3. Apparatus of the kind described, comprising a cherry holder having a pocket with a reduced open bottom, a pit presser mounted in coöperative relation with said pocket, and thick yielding strips normally closing the pocket bottom as it is in position beneath said presser and adapted to roll laterally in opposite directions and open under pressure of said presser as the cherry is pressed thereagainst to split the cherry and permit the pit to pass therethrough.

4. Apparatus of the kind described, comprising a movable carrier having lines of cherry receiving pockets to be successively brought to operative position, said pockets having open bottoms, a gang of pit pressers mounted to operate simultaneously on the cherries in a line of said pockets, and yielding strips extending lengthwise beneath the carrier and forming a common backing for the cherries in said pockets as they are operated on.

JAMES H. SMITH.

Witnesses:
F. WILLARD RICH,
HARRIET T. VAY.